United States Patent
Zimmerman et al.

(10) Patent No.: US 6,775,547 B2
(45) Date of Patent: Aug. 10, 2004

(54) TRANSMISSION QUALITY MEASUREMENT IN A COMMUNICATION NETWORK

(75) Inventors: Gerd Zimmerman, Eckental (DE); Joerg Huschke, Nürnberg (DE); Johan Torsner, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 474 days.

(21) Appl. No.: 09/858,067

(22) Filed: May 14, 2001

(65) Prior Publication Data

US 2002/0025807 A1 Feb. 28, 2002

(30) Foreign Application Priority Data

May 15, 2000 (EP) ............................................ 00110362

(51) Int. Cl.[7] .................................................. H04Q 7/20
(52) U.S. Cl. ........................ 455/450; 455/62; 455/63.1; 455/67.11
(58) Field of Search .......................... 455/67.11, 67.13, 455/67.15, 62, 63.1, 450

(56) References Cited

U.S. PATENT DOCUMENTS

| | | | | |
|---|---|---|---|---|
| 5,367,559 A | * | 11/1994 | Kay et al. | 455/425 |
| 5,539,748 A | | 7/1996 | Raith | 370/95.1 |
| 5,590,409 A | * | 12/1996 | Sawahashi et al. | 455/69 |
| 5,603,093 A | * | 2/1997 | Yoshimi et al. | 455/63.1 |
| 5,765,114 A | * | 6/1998 | Fukuda | 455/574 |
| 5,793,805 A | | 8/1998 | Nikides | 375/224 |
| 5,809,059 A | * | 9/1998 | Souissi et al. | 375/133 |
| 5,956,642 A | | 9/1999 | Larsson et al. | 455/449 |
| 5,995,498 A | | 11/1999 | Toot, Jr. et al. | 370/331 |
| 6,002,919 A | | 12/1999 | Posti | 455/67.1 |
| 6,028,894 A | | 2/2000 | Oishi et al. | 375/227 |
| 6,289,202 B1 | * | 9/2001 | Kikuchi | 455/62 |
| 6,330,429 B1 | * | 12/2001 | He | 455/67.11 |

FOREIGN PATENT DOCUMENTS

| | | |
|---|---|---|
| EP | 0 714 217 A2 | 5/1996 |
| EP | 0 812 119 A2 | 12/1997 |
| EP | 0 878 976 A1 | 11/1998 |
| EP | 0 967 818 A2 | 12/1999 |
| WO | WO 00/11903 | 3/2000 |
| WO | WO 00/24206 | 4/2000 |

OTHER PUBLICATIONS

Sieben, S., European Search Report, App. No. EP00110362, Feb. 1, 2001, pp. 1–10.

* cited by examiner

*Primary Examiner*—Nguyen T. Vo
*Assistant Examiner*—Nhan T. Le

(57) ABSTRACT

A method for measuring the transmission quality between a base station and at least one remote station in a communication network having at least one channel for transferring signals between said base station and said at least one remote station involves measuring a transmission quality for signal transmissions via said at least one channel, and defining a transmission quality measurement period for said at least one channel in relation to said measured transmission quality. Moreover, a system for a communication network having at least one base station and at least one remote station transferring signals between each other via at least one channel carries out the method of measuring the transmission quality, wherein the system comprises measuring means for measuring transmission qualities for signal transmissions via said at least one channel, means for the definition of at least one transmission quality measurement period for signal transmissions between said base station and said at least one remote station, and control means for the measurement of the transmission qualities during said at least one transmission quality measurement period.

19 Claims, 3 Drawing Sheets

TRANSMISSION QUALITY MEASUREMENT IN A COMMUNICATION NETWORK

BACKGROUND OF THE INVENTION

1. Technical Field

The present invention is related to communication networks and in particular to transmission quality measurements of communication signals between distributed components of a communication network.

2. State of the Art

In distributed wireless communication systems jointly using the same frequency bands or channels, the channel actually allocated to a base station for communication with respective remote stations has to be selected. Such a channel selection can be accomplished at the instant a communication connection between a base station and a remote station is set up (e.g. DECT-systems), centralized for all base station covering a certain geographical area (e.g. GSM-systems), or at arbitrary times (e.g. HIPERLAN/2).

In the latter case, which is addressed by the present invention, the channel selection, i.e. the allocation of certain frequencies of a jointly used frequency band, is performed de-centralized and autonomously at each base station. As a result, a selected channel is not allocated to individual communication links for a base station above allocated for a base station which uses the selected channel and the frequencies contained therein, respectively, for several communication links established with this base station.

Such selections and allocations of channels and frequencies, respectively, are often controlled by methods for a so-called adaptive channel selection (ACS). ACS-methods are based on measurements of received signal strength (RSS) levels on available channels for a base station. The RSS-measurements could be performed both in the up-link (i.e. the communication link from the base station to a remote station) and in the down-link (i.e. the communication link from a remote station to the base station). The result of a RSS-measurement is indicative of signal interference for signals transmitted between the base station and respective remote stations. In particular, down-link signal interference is caused by two or more remote stations communicating with same base station within a channel commonly used, while up-link signal interference on signals transmitted by a base station can result from signal interference of signals transmitted by base stations via a commonly used channel.

On the basis of RSS-measurements being indicative of the transmission quality of available channels, the channel selection/allocation for a base station is performed. In order to select/allocate the channel having an optimum transmission quality, the above ACS-methods have to react quickly on changed/modified operational conditions within a communication network. Therefore, the actual communication situation and especially signal interference associated therewith are monitored by means of RSS-measurements. In order to obtain the actual signal interference situation, conventionally, the RSS-measurements are performed continuously. Usually, measurement periods for RSS-measurement are predefined fixed time periods both for allocated and available channels. As used in the following, a measurement period is the time between two successive measurements.

Depending on the number of allocated/available channels and the number of remote stations assigned to a base station, this can result in a large number of measurements. Since RS-measurements for down-links are usually performed by remote stations, the large number of RSS-measurements lead to an increased need of additional power resources, which is especially disadvantageous for (mobile) remote stations using batteries. Further, an increased channel transmission capacity must be provided for measurement requests and measurement reports between base stations and remote stations. Moreover, an increased load can occur for handling measurement requests, reports and results at a base station, requiring an increased processing time and capacity.

Moreover, RSS-measurements should compensate for signal fluctuations due to varying propagation losses and varying transmission power for base and remote stations, in order to provide reliable results. On one hand, this can accomplished by a large number of measurements for continuously monitoring the current interference situation, also leading to the above-mentioned problems. On the other hand, temporary fluctuations of RSS-measurements can be compensated by linear filtering. In case RSS-measurement fluctuations do not occur temporarily but persistently, the linear filtering follows the RSS-measurements with a certain delay time leading to an delayed/impaired channel selection.

3. Object of the Invention

Principally, the object of the present invention is to solve the above-mentioned problems of known communication networks. In particular, the object of the present invention is to provide a method and a system for measuring the transmission quality in a communication network requiring a reduced number of measurements (e.g. RSS-measurements).

SUMMARY OF THE INVENTION

4. Principle Underlying the Invention

In order to reduce transmission quality measurements in a communication network, the present invention is based on the principle both to adaptively control transmission quality measurements with respect to operational conditions/situations in a communication network and/or to perform transmission quality measurements providing a long term transmission quality estimation for a communication network.

5. Solution According to the Invention

In particular the invention provides a method for measuring the transmission quality between a base station and at least one remote station in a communication network having at least one channel for transferring signals between the base station and the at least one remote station. The method comprises measuring a transmission quality for signal transmissions via the at least one channel, and defining a transmission quality measurement period for the at least one channel in relation to the measured transmission quality.

Preferably, the measuring of the transmission quality includes measuring of a transmission quality for a channel allocated to the base station for communicating with the at least one remote station and/or measuring of a transmission quality for at least one channel available for the base station for communicating with the at least one remote station.

Here, it is possible to define a transmission quality measurement period for the allocated channel in relation to a ratio of the transmission quality value of the allocated channel and at least one of the transmission quality value of the at least one available channel.

Moreover, the defining of the transmission quality measurement period include defining a transmission quality measurement period for each of the at least one available channel in relation to a ratio of the transmission quality value for the allocated channel and the transmission quality value for a respective one of the at least one available channel.

As a result, the ratio for the transmission quality measurement period for the allocated channel can be a ratio of the transmission quality value of the allocated channel and the maximum transmission quality value of the transmission quality value for the at least one available channel.

In order to select an optimal channel for the base station, the transmission quality measurement period for the allocated channel and the transmission quality measurement period for the at least one available channel are compared, whereby the allocated channel can be replaced by allocating one of the at least one available channel having a larger transmission quality measurement period compared to the allocated channel.

Further, the invention provides a method for measuring the transmission quality between a base station and at least one remote station in a communication network as defined above, wherein the method comprises determining the number of remote stations associated to the base station, and defining a transmission quality measurement period for the at least one channel in relation to the number of the remote stations for measuring the transmission quality for signal transmissions between the base station and the at least one remote stations.

Since the transmission quality for remote stations being not actively communicating with the base station have a lower importance compared to the transmission quality of actively, actually communicating remote stations, it is preferred that the number of the remote stations is determined for remote stations being in communication with the base station.

Moreover, a further method according to the invention for measuring the transmission quality in the above network comprises defining grouping criteria, assigning each of the at least one remote station to one of at least two remote station sets according to the grouping criteria, and defining transmission quality measurement periods for each of the remote station sets in relation to the grouping criteria.

Preferably, the transmission quality measurement periods are indicative of a transmission quality measurement period for measuring the transmission quality of signal transmissions between the base station and the at least on remote station of a respective one of the remote station sets. As a result, only the transmission quality for one of the remote station sets are required to be measured during the respective one of the transmission quality measurement periods.

In case no information required for the assignment of the remote stations are available, parameters of the at least one remote station associated to the base station are measured. Especially, the parameters should be in correspondence with the grouping criteria.

In one embodiment, the method includes defining the grouping criteria as being indicative of at least two transmission quality ranges/groups, measuring the transmission quality for each of the at least one remote station, assigning each of the at least one remote station to one of the remote station sets according to the respective remote station transmission quality, and defining the transmission quality measurement periods in relation to a respective one of the transmission quality ranges/groups.

In a further embodiment, the method includes defining of the grouping criteria being indicative of at least two data types, determining the data type being currently communicated between the base station and each of the at least one remote station, assigning each of the at least one remote station to one of the remote station sets according to the data type communicated to/from the respective remote station, and defining the transmission quality measurement periods in relation to a respective one of the data types.

Moreover, it is possible to combine the above embodiments. In one combination, for at least one of the remote station sets defined according to the transmission quality grouping criteria, at least two remote station subsets are defined according to the data type grouping criteria, and the transmission quality measurement periods for the at least two remote station subsets are defined in relation to the transmission quality ranges/groups and the data types, while transmission quality measurement periods for the remaining of the remote station sets not including remote station subsets are defined in relation to the transmission quality ranges/groups.

In another combination, for at least one of the remote station sets defined according to the data type grouping criteria, at least two remote station subsets are defined according to the transmission quality grouping criteria, and the transmission quality measurement periods for the at least two remote station subsets are defined in relation to the transmission quality ranges/groups and the data types, while transmission quality measurement periods for the remaining of the remote station sets not including remote station subsets are defined in relation to the data types.

As mentioned, the invention also provides for a method to perform transmission quality measurements for a long term estimation of the transmission quality. Here, the method for a communication network as described above comprises measuring of a transmission quality of transmission signals between a base station and at least one remote station via at least one channel allocated to the base station, defining of a first quality metric based on the signal strengths, measuring of a transmission quality of further transmission signals via the at least one channel of the base station, defining of a second quality metric based on the signal strength for the further transmission signals, and defining a transmission quality measurement period for the at least one channel in relation to the first and second quality metrics.

In particular, the first quality metrics is indicative of signal interference on a respective of the transmission signals caused by the base station and/or the at least one remote station, and the second quality metric is indicative of signal interference on the further transmission signals caused by the base station and/or at least one further base station. Or more particular the first quality metric is indicative of signal interference on a respective of the transmission signals caused by all interfering base stations and all interfering remote stations being active on the measured channel c, and the second quality metric is indicative of the maximum of the signal interference on the further transmission signals caused by at least one further interfering base station.

Further, it is possible to define a third quality metric as a function of the first and second quality metrics, wherein the transmission quality measurement period is defined in relation to the third quality metric.

To provide for a continuously measurement of the transmission quality, a series of the first quality metric is defined based on the signal strengths being sampled over a first period terminating at a first time, and/or a series of the second quality metric is defined based on the signal strengths being sampled over a second period terminating at a second time, and/or the third quality metric is defined at a third time on the basis of the first and second quality metric series.

For an embodiment of this method, the minimal second quality metric of the second quality metric series is determined, whereby the third quality metric can be defined as the minimum of the first quality metric most recently defined and the minimal second quality metric.

Preferably, the transmission signals are generated at the base station and/or at the at least one remote station in correspondence to communication signals being used for communication between the base station and the at least one remote stations and/or the further transmission signals are generated at the base station and/or at the at least one further base station in correspondence to communication signals thereof, the further transmission signals having a predetermined signal level, preferable the maximum signal level to be generated at the base station and/or at the at least one further base station.

For a selection of optimal channels, resulting in a further reduction of the required number of transmission quality measurements, the methods includes determining whether the third quality metric exceeds a predetermined quality level and allocating a respective channel to the base station for actual communication with the at least one remote station.

Moreover, for all above methods, embodiments can be provided, wherein the transmission quality measurement periods are set to a first predetermined transmission quality measurement period, if the transmission quality measurement periods exceed a first predetermined transmission quality threshold, and/or the transmission quality measurement periods are set to a second predetermined transmission quality measurement period, if the transmission quality measurement periods are below a second predetermined transmission quality threshold, and/or the transmission quality measurement periods are defined to be within a range between a minimal transmission quality measurement period and a maximal transmission quality measurement period.

Also, embodiments are considered, wherein transmission quality measurements are performed according to the transmission quality measurement periods, and the transmission quality measurements can be used to define new transmission quality measurement periods to be currently used.

Referring to the method according to the invention utilizing grouping criteria, it is possible to use the transmission quality measurements according to the transmission quality measurement periods to re-assign the at least one remote station to the remote station sets and/or to the remote station subsets according to a respective one of the transmission quality measurements.

Especially in the case of data type grouping criteria, it is preferred to determine data types being communicated between the base station and the remote stations in line with the transmission quality measurement periods for reassigning the at least one remote station to the remote station sets and/or the remote station subsets.

In order to consider different parameter influencing the measured transmission quality, it is considered to determine the signal strengths and/or numbers of transmission errors for signal transmissions between the base station and the at least one remote station. Alternatively the transmission quality can be assessed from measurements of the signal strength of the signal transmission between the base station and the at least one remote station and relating this signal strength measurements to the interfering signal strength.

Since the transmission situation in a communication network changes over time depending e.g. on the number of base stations jointly using channels, the number and types of communicating remote stations and the like, the measurement of the transmission quality should be adapted to fulfil varying network requirements. Therefore, the invention contemplates to arbitrarily combine the above described methods. Such combinations include the utilization of different methods according to the invention for base and remote stations, wherein each station can use different embodiments, subsequently or in parallel.

Additionally, the object of the invention is solved by a system for a communication network having at least one base station and at least one remote station transferring signals between each other via at least one channel for carrying out of one of the methods according to the invention. The system comprises measuring means for measuring the transmission quality of signal transmissions via the at least channel, means for the definition of at least one transmissions quality measurement period for signal transmissions between the base station and the at least one remote station, and control means for the measurement of the transmission quality during the at least one transmission quality measurement period.

In particular, the system can be operated with respect to the at least one channel being allocated to or available for the base station.

Depending on the network in which the system according to the invention is used, the measuring means are located at the base station and/or at the at least one remote station, the transmission quality measurement period definition means are located at the base station, the control means are located at the base station and/or at the at least one remote station, and transmission and reception means are provided at the base station and at the at least one remote station for communicating the measured transmission quality.

BRIEF DESCRIPTION OF THE DRAWINGS

Further aspects and advantages of the invention will become apparent upon reading the following detailed description of preferred embodiments of the invention and upon reference to the drawings, in which.

DETAILED DESCRIPTION OF PREFERRED EMBODIMENTS

Figure 1:
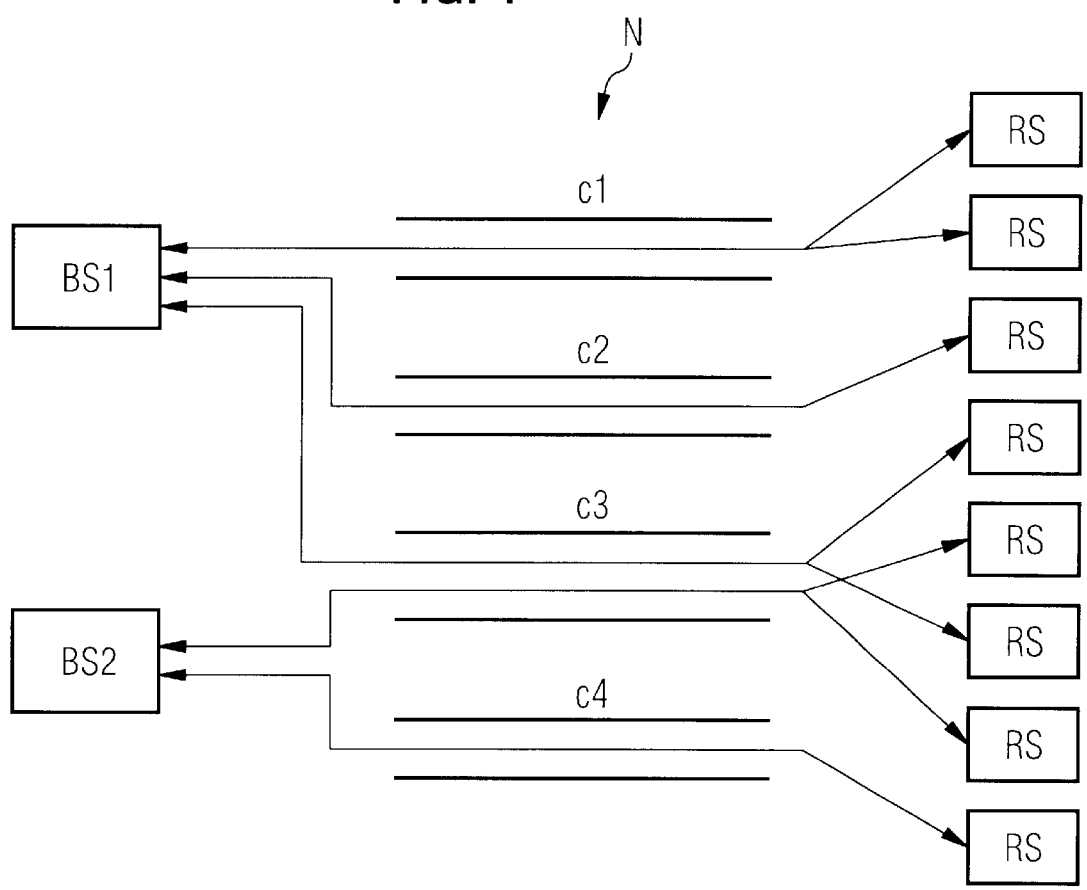
FIG. 1 is a schematic illustration of a communication network used for the invention.

As shown in FIG. 1, a communication network N comprises several base stations BS and several remote stations RS. The base stations BS and the remote stations RS can be any device or system which are adapted to communicate by transferring data/information between each other. In particular, base stations BS include base stations of radio, mobile, cellular, public, satellite, broadcast, and computer networks, especially employed for telephone services, and any kind of device or system providing communication links between remote stations. Further, remote stations RS include any kind of device or system adapted to communicate with a base station as described above and/or with each other via such a base station. Examples for remote stations RS comprise radio, mobile, cellular, stationary and satellite telephones, mobile and stationary computer systems, broadcast end user devices (e.g. a set-top-box), end user devices for paging systems, etc.

In principle, a base station BS and remote station RS associated therewith communicate over at least one channel c. Usually, in the communication network N several channels c1, ..., c4 are provided to serve as communication links between base stations BS and remote stations RS.

In terms of the invention, the channels c1, ..., c4 can be assigned to one or more base stations BS or can be just available for the base stations BS. As shown in FIG. 1, the channels c1, c2 and c3 are allocated to a base station $BS_1$, while the channels c3 and c4 are allocated to a base station $BS_2$. The base stations $BS_1$ and $BS_2$ utilize its assigned channels for current communication with respective remote stations RS. It is assumed that the channels $c_1$ and $c_2$ are available for the base station BS, i.e. the base station $BS_2$ can utilize these channels upon assignment thereof, while current communication of the base station $BS_2$ is not performed via the channels c1 and c2 being adjust available. Comparable, the channel $c_4$ is available for the base station $BS_1$ but not used for current communication.

As a result of channels being allocated to and available for different base stations BS, communication of different base stations BS, e.g. the base stations $BS_1$ and $BS_2$, can occur over same channels as illustrated by channel $c_3$ of FIG. 1. Depending on the configuration of the network N (e.g. type and number of base stations, remote stations and channels, type and amount of communicated data/information, ...) and the current operational condition/situation of the network N, it is necessary to adaptively control the selection of channels c allocated for base stations BS to obtain appropriate channel transmission qualities. The selection/allocation of channels for base stations BS will be described below in a greater detail.

In terms of the invention, channels comprise any kind of communication links, for examples radio communication links, radio carrier, frequency bands, fixed wired communication links, communication busses, broadcast channels, satellite signal beams, multiple fiber optic connections, ultrasound/ultrasonic links, etc.

In order to facilitate the understanding of the present invention, the description of preferred embodiments will refer to mobile/cellular telephone networks, wherein the network N is a public link mobile network, the base stations BS are service switching centers, and the remote stations RS are mobile stations (e.g. mobile/cellular telephones).

As mentioned, the selection of channels to be allocated for base stations is essential for the operation of such networks to maintain a sufficient transmission quality between base stations and remote stations. The transmission quality of a channel or communication link between a base station and a remote station is assessed on the basis of measurements of the signal strengths received by a base station and a remote station, respectively (e.g. RSS-measurements).

Adaptive Channel Allocation (ACA) based Transmission Quality Measurement Period

The received signal strength (RSS) measurements to access the transmission quality between a base stations and remote stations are used to select/allocate a channel to the base station providing a desired, appropriate communication link. The results of the RSS-measurement generally fluctuate over time because of varying propagation losses (path losses) and varying transmission power of the base and remote stations. Such fluctuations or the current traffic load can lead to a selection/allocation of channels not meeting the requirements for communication (links) between the base station and remote stations.

In order to compensate for such fluctuations, an Adaptive Channel Allocation (ACA) is used which is based on two inputs, both thereof corresponding to the same considered channel. The first input is a quality measure related to the interfering RSS measured on the channel. This quality measure reflects the effect of interference on the reception quality of signals communicated between the base station and the remote stations using this channel for communication. Further, this quality measure considers interference caused by the base station and the remote stations alike.

The second input is a quality measure which does not consider interference caused by the remote stations, but considers only interference caused by other base stations using the same channel.

To obtain the first quality measure, a first quality metric $Q_s(t_1,c)$ is derived on the basis of a time series of RSS-measurements collected on a channel c. The first quality metric $Q_s(t_1,c)$ is indicative of the signal interference on signals which would be perceived by the measuring unit, either the base station or a respective remote station, if the channel c is used for current communication there between. The RSS-measurements considered here end at the time $t_1$.

In order to obtain the second quality measure reflecting interference generated by base stations, the considered channel c is searched for base station signals utilized for communication with remote stations associated to different base stations other than the measuring base station, or to the base station the measuring remote station is associated with. On the basis of RSS-measurements collected on the channel c during the transmission of such communication signals from base stations, a second quality metric $Q_b(t_2,c)$ is derived. The RSS-measurements used for the second quality metric $Q_b(t_2,c)$ end at a second time $t_2$, whereby new values for the first and second quality metrics can be available at different times. The second quality metric $Q_b(t_2,c)$ reflects the effect of signal interference generated by one or more base stations transmitting communication signals via the channel c on the quality of signals received by the respective measuring units (i.e. remote station), in case the measuring unit communicates via the channel c.

This approach is based on the fact that, for a typical communication situation in a network, the average load of base stations is much larger compared to the average load of any single remote station. Therefore, single interference caused by one or more base stations is assumed to have a higher importance for the assessment of the overall transmission quality of a used channel with respect to remote stations.

In case the first quality metric $Q_s(t_1,c)$ is high compared to the second quality metric $Q_b(t_2,c)$ because interfering base stations have currently little load (i.e. a small number of active communication links supported by the base stations), this situation is not considered to be representative for signal interference in the long term. Therefore, the long term transmission quality is estimated assuming that the base station causing the largest interference with respect to RSS transmitted the interference causing signals continuously with signal levels corresponding to the second quality metric $Q_b(t_2,c)$.

In order to obtain this condition, the base station(s) to be considered for RSS-measurements for the second quality metric $Q_b(t_2,c)$ are operated to transmit interference causing signals at the maximum signal level which is permitted to be used for any transmission of the base station(s).

To determine the long term interference for the channel c, a long term quality metric $Q_l(t_3,c)$ is defined as a function of the first and second quality metrics $Qs(t_1,c)$ and $Q_b(t_2,c)$. The long term quality metric $Q_l(t_3,c)$ is defined at a time $t_3$ when a new value for either the first quality metric or the second quality metric is available. Assuming that the time needed to obtain (signal transmission, measurement, calculation, . . . ) a new value for the first and second quality metrics is rather short, the time $t_3$ substantially corresponds to either time $t_1$ or time $t_2$.

For the definition of the long term quality metric, a minimal value of all second quality metrics corresponding to all base stations using the channel c is determined, the minimal value being denoted $Q_b(t_2,c)_{min}$, and compared with the most recent value for the first quality metric. So, the long term quality metric $Q_1(t_3,c)$ is defined by:

$$Q_1(t_3,c)=g(Q_s(t_1,c), Q_b(t_2, c)_{min}),$$

wherein $g(x,y)$ is a function of the two variables x and y. Here, $x=Q_s(t_1,c)$ and $y=Q_b(t_2,c)$.

In one embodiment of the Adaptive Channel Allocation (ACA) the function g is defined by:

$$g(x,y)=\min(x,y).$$

Therefore, the long term quality metric $Q_1(t_3,c)$ is defined as the minimum of either the current first quality metric $Q_2(t_1,c)$ or the minimal second quality metric $Q_b(t_2,c)_{min}$. As a result, the variance of the long term quality metric, i.e. the fluctuations over time, is smaller than or equal to the variance of the first quality metric.

In case the first quality metric is only determined by the noise level for the channel c, the value for the first quality metric is larger than the value for the minimal second quality metric. In consequence, the value for the long term quality metric corresponds with the value for the minimal second quality metric. Further, the long term quality metric is equal to the minimal second quality metric whenever the first quality metric is dominated by transmissions via the channel c having a smaller transmission level and/or a larger transmission path loss compared to transmissions of the base station which determines the minimal second quality metric.

In order to perform the Adaptive Channel Allocation (ACA) for a base station, the above long term quality metric is calculated for each channel available for the considered base station. On the basis of the calculated long term quality metrics, channels having a long term quality metric larger than a transmission quality threshold $Q_{th}$ are selected as suitable to be allocated to the considered base station.

The above described procedure for channel selection/allocation (ACA) provides an increased long term transmission quality and a reduced rate of changes of channels allocated to base stations. The improvements and benefits of the ACA can be utilized in any known communication network by replacing conventional channel selection/allocation procedures.

Furthermore, the ACA allows to reduce the number of transmission quality measurements due to the improved reliability and the long term characteristic of the calculated transmission quality measure, i.e. the long term quality metric.

On the basis of the long term quality metric, a transmission quality measurement period $T(c)$ if defined for a channel c. Channels exhibiting a high transmission quality indicated by a high value for the long term quality metric require a smaller number of transmission quality measurements compared to channels having a smaller transmission quality, i.e. smaller values for the long term quality metric. Therefore, the transmission quality measurement period for a channel with a good transmission quality is defined to be larger in comparison to the transmission quality measurement period for a channel with a worse transmission quality.

Channel Based Transmission Quality Measurement Period

This embodiment is based on the approach to adaptively control transmission quality measurement periods separately for each channel $c_1, \ldots, c_n$ in dependence on the current accessed respective transmission quality $Q(c_1), \ldots, Q(c_n)$ The transmission quality $Q(c)$ for a channel c is calculated on the basis of up-link and down-link measurements for the channel c, for example RSS-measurements.

The measurement period $T(c)$ indicative of the time interval between two successive transmission quality measurements for channel c depends not only on the quality $Q(c)$ of each channel c but is also selected differently for channels allocated and used by a base station and a channels available for other base station but not used by the same. Further, it is assumed that a base station BS uses a channel $c_0$ allocated therewith, while channels $c_{u1}, \ldots, c_{un}$ are available for but not used by the base station BS. In general, the transmission quality measurement period $T(c_0)$ for the used channel $c_0$ should be the shorter the worse the quality $Q(c_0)$ of the used channel $c_0$ is compared to the maximal value of the transmission quality values $Q(c_{u1}), \ldots, Q(c_{un})$ for the unused channels $c_{u1}, \ldots, c_{un}$. Therefore, the transmission quality measurement period $T(c_0)$ for the used channel $c_0$ is given by:

$$T(c_0)=A \cdot Q(c_0)/\max(Q(c_{u1}, \ldots Q(c_{un})),$$

wherein A is a predetermined value previously defined with respect to the technical characteristics of the considered network.

Further, the transmission quality measurement period $T(c_{u1}), \ldots T(c_{un})$ for unused channels $c_{u1}, \ldots, c_{un}$ should be selected shorter the better the quality of the respective unused channel is compared to the quality $Q(c_0)$ of the currently used channel $c_0$. So, the transmission quality measurement periods $T(c_u)$ for an unused channel $c_u$ is given by:

$$T(c_u)=B \cdot Q(c_0)/Q(c_u),$$

wherein B is a predetermined value previously defined in relation to the technical characteristics of the considered network.

As a result of this definition of transmission quality measurement periods is that unused channels $c_u$ are more often measured the closer the transmission quality $Q(c_u)$ thereof is to the transmission quality $Q(c_0)$ of the currently used channel $c_0$. This definition considers the fact that an unused channel $c_u$ becomes a candidate for a channel selection/allocation for the base station BS upon exhibiting an improved unused channel quality $Q(c_u)$. When the currently used channel co has a high transmission quality $Q(c_u)$ compared to the transmission quality $Q(c_0)$ of unused channels $c_u$ there is no need for a channel reselection/reallocation. Therefore, the transmission quality measurement period $T(c_0)$ for the used channel $c_0$ is defined to be longer. This is a special importance for small networks, especially for single cell networks, in which the number of available channels with excellent transmission quality, i.e. channels with substantially no interference, is higher than the number of currently used channels.

Base Station Related Transmission Quality Measurement Periods

In this embodiment, transmission quality measurement periods are adaptively controlled for each base station depending on the number of remote station associated with a single base station. Here, the number N of remote stations RS associated with a base station and available for transmission quality measurements is determined, and a transmission quality measurement period T(c) for a channel c allocated to the base station BS is defined depending on the number N of remote stations RS.

This approach allows to maintain a nearly constant number of transmission quality measurements per time resulting in a substantially constant load for the transmission quality measuring units at the base station BS and/or at the remote station RS and a constant accuracy of the mean values for the transmission quality. Since the required transmission capacity of the channel c linearly increases with an increasing number N of associated remote stations RS, it is desired to reduce the number of measurements (i.e. to enlarge the transmission quality measurement period T(c)) with an increasing number N of associated remote stations RS. This relation is given by:

$$T(c)=f(N).$$

As a result, the transmission capacity necessary for transmission quality measurements including request and reporting transmissions is reduced and can be used for actual communication between the base station BS and the associated remote stations RS.

Remote Station Based Transmission Quality Measurement Periods

The main idea underlying this embodiment is to adaptively control sets/groups of remote stations which are requested to measure transmission parameters (e.g. transmission qualities) in dependence to respective transmission parameters defining the remote station sets/groups. Here, each remote station RS associated with a base station BS is assigned to one of at least two sets S(i,c), wherein the assignment of the remote stations RS to the remote station sets S(i,c) is performed for all channels c available for the base station BS, irrespective of whether the base station BS is using a channel or not. Before the assignment of the remote stations RS, it is necessary to define grouping criteria for the at least two remote station sets S(i,c). These grouping criteria are indicative of transmission parameters according to which the grouping of the remote station sets RS has to be accomplished.

In view of existing communication networks which usually provide transmission quality measurements (e.g. RSS-measurements), one embodiment utilizes grouping criteria being indicative of at a least two transmission quality ranges/groups. On the basis of transmission quality measurements for the remote stations RS, in up-link and down-link communication with the base station BS for all available channels c, each of the remote stations RS is assigned to one of the remote station sets S(i,c) being indicative of a transmission quality range/group including the respective remote station transmission quality. Then, transmission quality measurement periods are defined for each of the remote station sets S(i,c) in relation to the respective transmission quality range/group. In order to measure the transmission quality of remote stations having a low transmission quality more often than remote stations having a high transmission quality, the transmission quality measurement periods for remote station sets covering a low transmission quality range is set to be smaller compared to transmission quality measurement periods for remote station sets covering a higher transmission quality range.

As a result of the definition of difference transmission quality measurement periods for the remote station sets, during a transmission quality measurement of a certain remote station set, only the transmission quality for remote stations of that certain remote station set are measured. In order to limit transmission quality measurements for each of the remote station sets, a maximal number $N_{max}$ of remote stations RS to be assigned to a certain remote station set is defined. In case the maximal number $N_{max}$ of remote stations is exceeded in one or several remote station sets, the respective remote station set is divided into subsets or all remote station sets are re-defined, such that each set contains maximal $N_{max}$ remote stations RS.

For assigning the remote stations RS to a certain remote station set S(i,c), different solutions are possible, namely a strictly ordered assignment or a threshold based assignment.

Figure 2A:
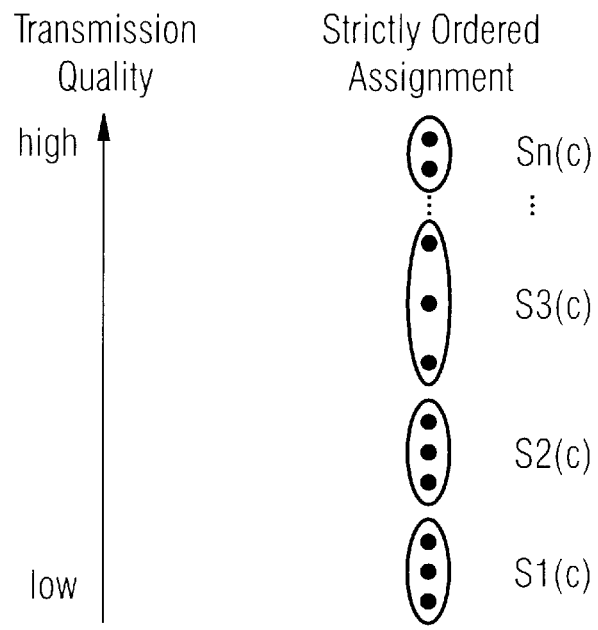
FIG. 2A illustrates a first grouping scheme according to the invention.

For the strictly ordered assignment, the first $N_{max}$ remote stations RS having the lowest transmission quality values q(m,c) are assigned to a first remote station set S(1,c). The next $N_{max}$ remote stations RS with the next low transmission quality values q(m,c) are assigned to a second remote station set S(2,c) and so forth. The last remote station set S($i_{max}$,c) contains the last remaining remote stations RS having the highest transmission quality values q(m,c). As a result of the strictly ordered assignment, all remote station sets S(i,c) contain the same number $N_{max}$ of remote stations RS, while only the last remote station set S($i_{max}$,c) can contain less than $N_{max}$ remote stations RS. In FIG. 2A a strictly ordered assignment of remote stations RS is illustrated, wherein the maximal number $N_{max}$ of remote stations RS is three and the number i of remote station sets S(i,c) is three.

Figure 2B:
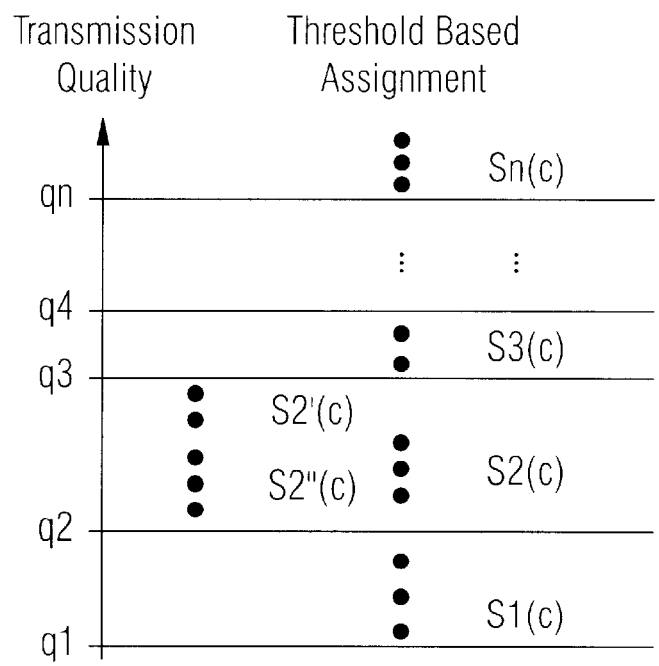
FIG. 2B illustrates a second grouping scheme according to the invention.

For the threshold based assignment, the remote station sets S(i,c) are defined to cover a certain transmission quality range, each thereof between an upper and a lower transmission quality threshold $q_t$. As shown in FIG. 2B, the remote station set S(1,c) covers the frequency range between the lower threshold $q_1$ and the upper threshold $q_2$, the remote station set S(2,c) covers the frequency range between the lower threshold $q_2$ and the upper threshold $q_3$, and so forth. The thresholds $q_t$ can be fixed parameters or can be modified during the operation of a respective communication network in relation to desired and/or actual operation conditions thereof. The thresholds $q_t$ do not have to be uniformly distributed over the considered transmission quality range.

If the number of remote station sets RS in a remote station set S(i,c) exceeds the maximal number $N_{max}$ of remote stations RS, the respective remote station set is subdivided into remote station subsets including no more than $N_{max}$ remote stations RS. In FIG. 2B, this case is illustrated for the frequency range between $q_2$ and $q_3$ by defining remote station subsets S'(2,c) and S''(2,c).

Further, it is possible to define grouping criteria for remote station sets with respect to data types communicated between a base station and a remote station. Regarding the enhanced communication possibility of known communication networks, it is possible that communication links between different remote stations and a common base station are used for the transmission of different types of data. Examples for such data types are digital, analog, voice, video, audio, public, confidential data, internet pages/websites, WAP-(Wireless Application Protocol)-data, paging signals, etc. In order to maintain a decides transmission security for such different data types, a suitable transmission quality for the respective data types must be provided. For example, confidential data (e.g. communicated during telephone banking operation) require a higher transmission quality compared to the transmission quality required for conventional telephone calls in order to transmit the confidential data in a complete, correct and secure manner.

Employing data type related grouping criteria, the data type communicated between a remote station RS and a base station BS or the communicated data type requiring the highest transmission quality is determined. Subsequently, the remote stations RS are assigned to the remote station sets S(i,c) according to the respective determined data type to be considered for the remote station assignment.

Figure 3:
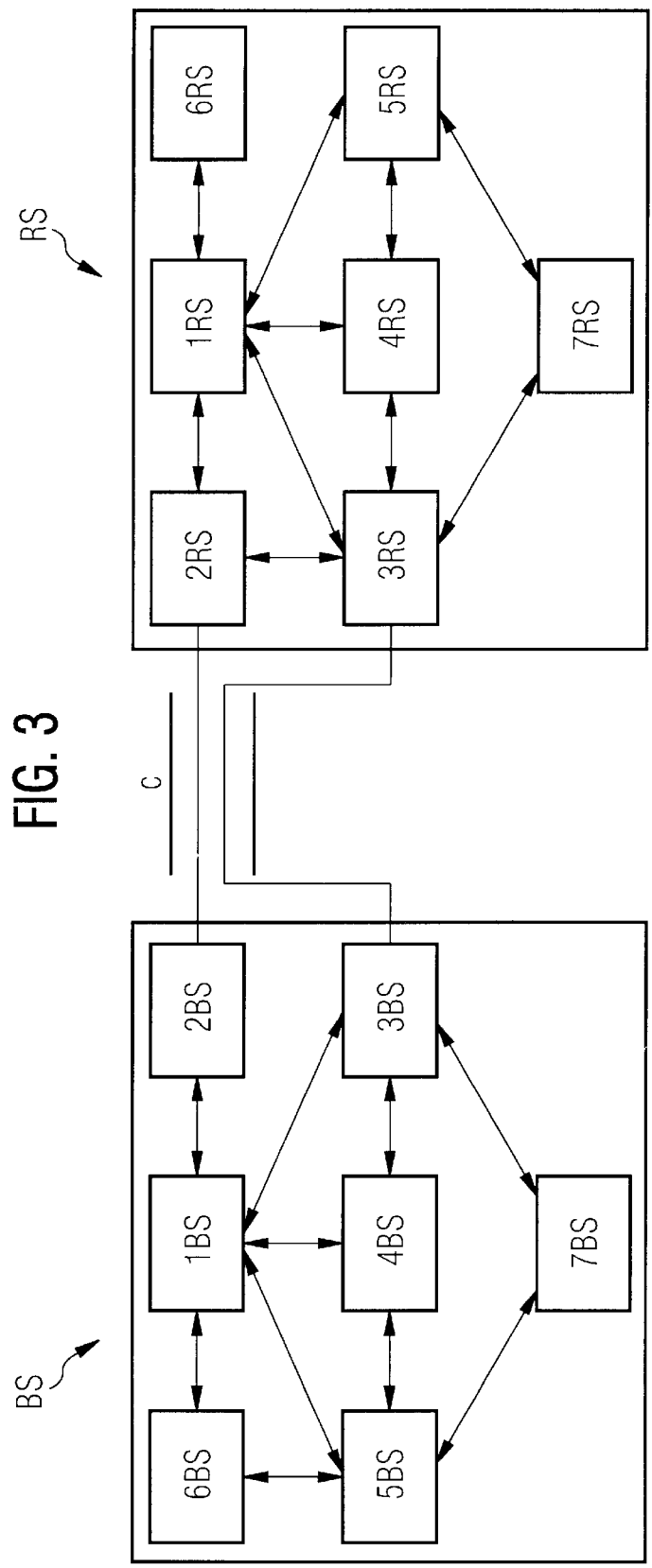
FIG. 3 is a schematic illustration of a base station and a remote station according to the invention.

System for Defining Transmission Quality Measurement Period in a Communication Network In FIG. 3 only one base station BS and only one remote station RS of the communication network N of FIG. 1 are shown. Further, only one channel c is shown as being allocated and used for communication.

The base station BS comprises control means 1BS connected to sender means 2BS and receiver means 3BS. The sender and receiver means 2BS, 3BS are used for communication with the remote station RS and are controlled by the control means 1BS. For transmission quality measurements and, if desired, for a determination of transmitted data types for down-link transmissions from the remote station RS, transmission quality measurement means 4BS and data type determination means 7BS are provided as illustrated in FIG. 3. Moreover, the base station includes storage means 6BS in which previous measurement results (transmission quality, data type), transmission quality thresholds, minimal and maximal transmission quality measurement periods, the above described grouping criteria, the maximal number of remote stations to be assigned to a remote station set, etc. can be stored.

The components 1RS, . . . , 7RS of the remote station RS shown in FIG. 3 are similar to the respective components of the base station BS, but are used for measurements with respect to up-link communication from the base station BS. In case the remote station RS is operated to define respective transmission quality measurement periods, the remote station RS is designed as shown in FIG. 3, namely to include means 5RS for defining transmission quality measurement periods. In view of known communication systems wherein conventionally remote stations perform respective transmission measurements and report the results thereof to a associated base station, it is contemplated that the remote station RS is modified not to comprise the mean 5RS. As a consequence, it is necessary to communicate transmission measurement results of the remote station RS to the base station BS, e.g. by means of the sender means 3RS.

The base station BS and the remote station RS shown in FIG. 3 are adapted to implement one or several of the above described methods for defining transmission quality measurement periods. In particular, it is possible that the base station BS utilizes a different method compared to the method utilized by the remote station RS. Further, it is contemplated that both the base station BS and the remote station RS utilize at least two of the above described methods in combination, wherein such a combination includes a subsequently application of selected methods and application of methods at the same time.

What is claimed is:

1. A method for measuring transmission quality between a base station and at least one remote station in a communication network having at least one channel for transferring signals between said base station and said at least one remote station said method comprising:

measuring a transmission quality for signal transmissions via said at least one channel; and defining a transmission quality measurement period for said at least one channel in relation to said measured transmission quality wherein said defining of said transmission quality measurement period includes at least one of:

defining a transmission quality measurement period for said allocated channel in relation to a ratio of said transmission quality of said allocated channel and said transmission quality of said at least one available channel; and defining a transmission quality measurement period for each of said at least one available channel in relation to a ratio of said transmission quality for said allocated channel and the transmission quality for a respective one of said at least one available channel.

2. The method according to claim 1, wherein said measuring of said transmission quality includes at least one of:

measuring a transmission quality for a channel allocated to said base station for communicating with said at least one remote station; and measuring a transmission quality for at least one channel available for said base station for communicating with said at least one remote station.

3. The method according to claim 1, wherein said ratio for said transmission quality measurement period for said allocated channel is a ratio of said transmission quality of said allocated channel and a maximum transmission quality of said transmission quality for said at least one available channel.

4. A method for measuring transmission quality between a base station and at least one remote station in a communication network having at least one channel for transferring signals between said base station and said at least one remote station, said method comprising:

determining a number of remote stations associated with said base station; and defining a transmission quality measurement period for said at least one channel in relation to said number of said remote stations for measuring the transmission quality for signal transmissions between said base station and said at least one remote station.

5. A method for measuring transmission quality between a base station and at least one remote station in a communication network having at least one channel for transferring signals between said base station and said at least one remote station, said method comprising:

defining grouping criteria;

assigning each of said at least one remote station to one of at least two remote station sets according to said grouping criteria; and defining transmission quality measurement periods for each of said remote station sets in relation to said grouping criteria.

6. The method according to claim 5, including:

defining said grouping criteria as being indicative of at least two transmission quality ranges, wherein each remote station set is defined to cover a respective certain transmission quality range;

measuring the transmission quality for each of said at least one remote station;

assigning each of said at least one remote station to one of said remote station sets according to the respective remote station transmission quality; and defining said transmission quality measurement periods in relation to a respective one of said transmission quality ranges.

7. The method according to claim 5, including the steps of:

defining said grouping criteria as being indicative of at least two data types;

determining a data type being currently communicated between said base station and each of said at least one remote station;

assigning each of said at least one remote station to one of said remote station sets according to the data type communicated between said base station and the respective remote station; and defining the transmission quality measurement periods in relation to a respective one of said data types.

8. The method according to claim 5, wherein:

transmission quality measurements are performed according to said transmission quality measurement periods; and said transmission quality measurements used for at least one of:
    defining new transmission quality measurement periods to be currently used; and
    reassigning said at least one remote station to at least one of said at least two remote station sets and remote station sub-sets.

9. The method according to claim 8, wherein said measuring of said transmission quality includes at least one of:

determining signal strengths for signal transmissions between said base station and said at least one remote station; and determining numbers of transmission errors for signal transmissions between said base station and said at least one remote station.

10. A method for measuring transmission quality between a base station and at least one remote station in a communication network having at least one channel for transferring signals between said base station and said at least one remote station, said method comprising:

measuring signal strengths of transmission signals between a base station and at least one remote station via at least one channel allocated to said base station;

defining a first quality metric based on said signal strengths;

measuring signal strengths of further transmission signals via said at least one channel of said base station;

defining a second quality metric based on said signal strengths for said further transmission signals; and defining a transmission quality measurement period for said at least one channel in relation to said first and second quality metrics.

11. The method according to claim 10, wherein:

said first quality metric being indicative of signal interference on said transmission signals caused by at least one of said base station and said at least one remote station; and said second quality metric being indicative of signal interference on said further transmission signals caused by at least one further base station.

12. The method according to claim 10, including:

defining a third quality metric as a function of said first and second quality metrics; and defining said transmission quality measurement period in relation to said third quality metric.

13. The method according to claim 12, including:

determining a minimal second quality metric of a series of said second quality metric; and defining said third quality metric as the minimum of said first quality metric most recently defined and said minimal second quality metric.

14. The method according to claim including:

determining whether the third quality metric exceeds a predetermined transmission quality level; and allocating a channel to said base station for actual communication with said at least one remote station based on said determination.

15. The method according to claim 10, wherein said defining the transmission quality measurement period includes at least one of:

setting the transmission quality measurement period to a first predetermined transmission quality measurement period, if said transmission quality measurement period exceeds a first predetermined transmission quality threshold;

setting the transmission quality measurement period to a second predetermined transmission quality measurement period, if said transmission quality measurement period is below a second predetermined transmission quality threshold; and defining the transmission quality measurement period to be within a range between a minimal transmission quality measurement period and a maximal transmission quality measurement period.

16. A method for measuring transmission quality between a base station and at least one remote station in a communication network having at least one channel for transferring signals between said base station and said at least one remote station, said method comprising:

measuring a transmission quality for signal transmissions via said at least one channel;

performing at least one of:
    determining a number of remote stations, associated with said base station; and
    defining grouping criteria and assigning each of said at least one remote station to one of at least two remote station sets according to said grouping criteria;

defining a first quality metric based on said transmission quality;

measuring a transmission quality of further transmission signals via said at least one channel of said base station;

defining a second quality metric based on said transmission quality for said further transmission signals; and defining a transmission quality measurement period for said at least one channel in relation to said first and second quality metrics and in relation to at least one of said number of said remote stations and said grouping criteria.

17. A system for a communication network having at least one base station and at least one remote station transferring signals between each other via at least one channel, comprising:

measuring means for measuring transmission quality for signal transmissions via said at least one channel;

means for defining at least one transmission quality measurement period for signal transmissions between one of said at least one base station and said at least one remote station, wherein said means for defining said transmission quality measurement period includes at least one of means for defining a transmission quality measurement period for said allocated channel in relation to a ratio of said transmission quality of said allocated channel and said transmission quality of said at least one available channel and means for defining a transmission quality measurement period for each of said at least one available channel in relation to a ratio of said transmission quality for said allocated channel and the transmission quality for a respective one of said at least one available channel; and control means for the measurement of the transmission quality according to said at least one transmission quality measurement period.

18. The system according to claim 17, said system being adapted to be operated with said at least one channel being allocated to or available for said base station.

19. The system according to claim 17, wherein said ratio for said transmission quality measurement period for said allocated channel is a ratio of said transmission quality of said allocated channel and a maximum transmission quality of said transmission quality for said at least one available channel.

* * * * *